Sept. 22, 1931. J. A. DENNIS 1,824,077
LEVERAGE POWER LIFT DEVICE
Filed Aug. 7, 1928 2 Sheets-Sheet 1
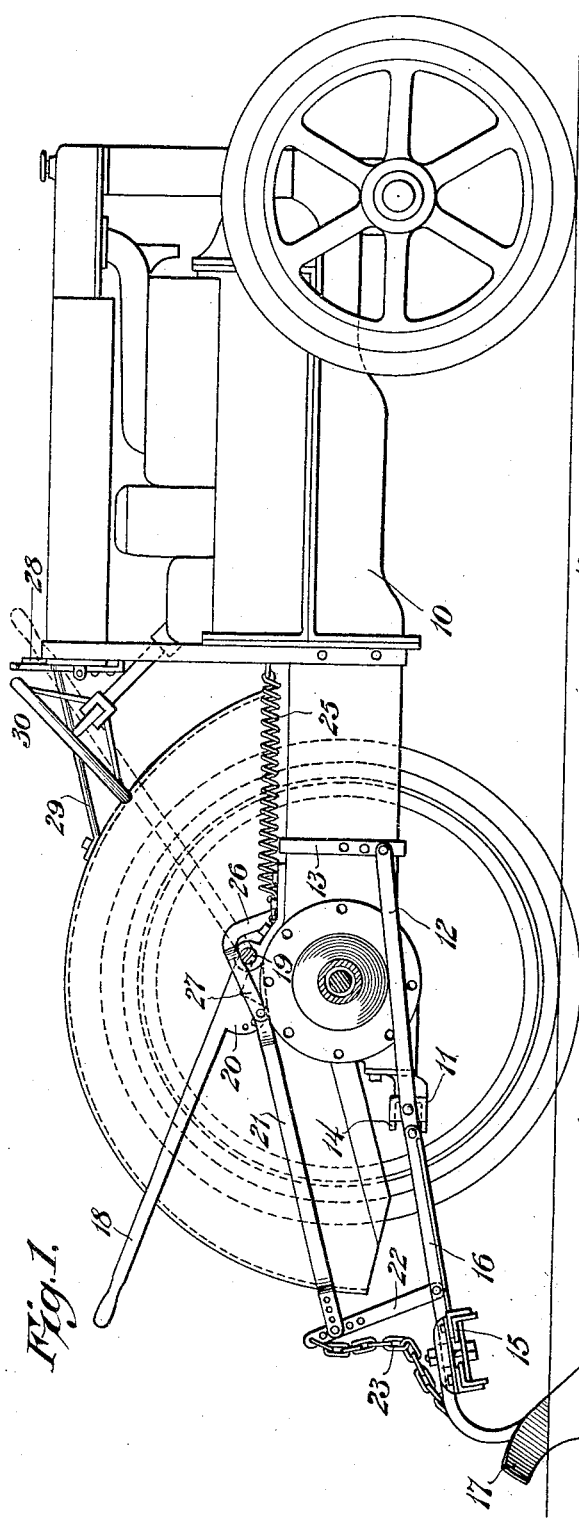
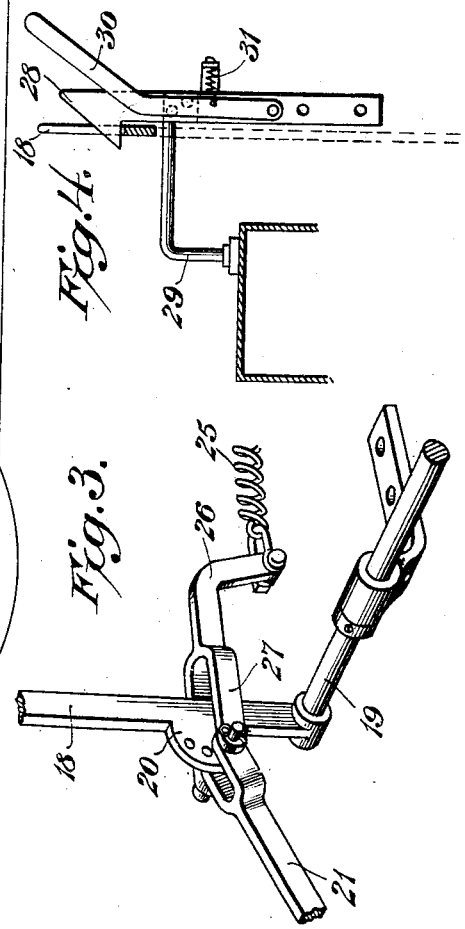
John A. Dennis, Inventor,
by *Sigger & Adams,*
Attorneys Sept. 22, 1931. J. A. DENNIS 1,824,077
LEVERAGE POWER LIFT DEVICE
Filed Aug. 7, 1928 2 Sheets-Sheet 2
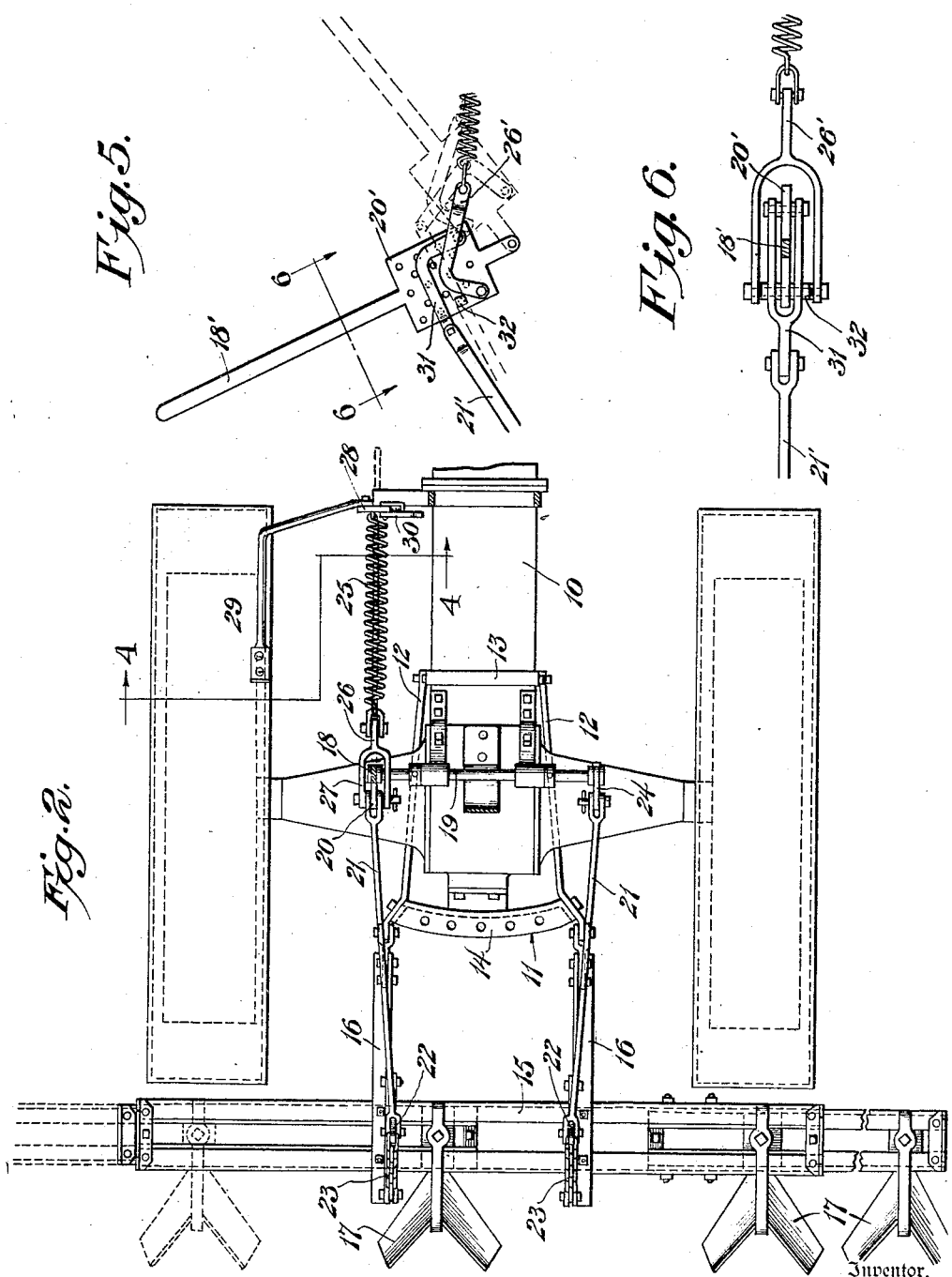
Inventor,
John A. Dennis,
By
Liggus & Adams,
Attorneys Patented Sept. 22, 1931

1,824,077

UNITED STATES PATENT OFFICE

JOHN A. DENNIS, OF EDISON, CALIFORNIA

LEVERAGE POWER LIFT DEVICE

Application filed August 7, 1928. Serial No. 297,993.

This invention relates to leverage power lift devices for farm implements such as cultivators or gang plows adapted to be connected to tractors and aims, among other objects, to provide an improved gang lifting mechanism. One of the important features of the invention involves the provision of improved gang lifting mechanism so arranged that the operator can very easily and quickly lift the gang to its inoperative position without shifting his position in the driver's seat and without exerting any great effort.

In the accompanying drawings,

Fig. 1 is a sectional view, partly in elevation showing one form of the improved gang and lifting mechanism applied to an ordinary tractor;

Fig. 2 is a top plan view of the gang and its lifting mechanism shown in Fig. 1;

Fig. 3 is a fragmentary perspective view of a portion of the lifting mechanism;

Fig. 4 is a fragmentary sectional view taken on the line 4—4 in Fig. 2;

Fig. 5 is a side elevation of a modified form of lifting lever; and

Fig. 6 is a sectional view taken on the line 6—6 of Fig. 5.

Referring particularly to the drawings, the preferred form of gang lifting mechanism constituting the present invention, is shown as being applied to a tractor 10 to which is connected a gang cultivator, it being understood that the mechanism is capable of use on a wide variety of tools. Herein, a draw bar 11 is shown as being connected to the rear end of the transmission housing of the tractor and is braced by a pair of links 12, conveniently bolted to a collar 13 (Fig. 1) so that the links assist in supporting the weight on the draw bar when operating the attachment on a tractor. The draw bar is shown as being a curved perforated channel bar 14. The links or arms 12 are extended beyond the end portions of the curved bar 14.

Referring to Figs. 1 and 2, there is shown a gang bar 15, which is preferably, though not necessarily, extensible, being made of structural steel elements and this bar is pivotally connected to the links 12 by means of draw bar links 16, the arrangement being such that the gang bar can be raised and lowered with respect to the draw bar. It is understood that any type of suitable farm implements such as cultivators, plows or the like may be connected to the gang bar. Herein, a series of plows 17 are shown as being suitably connected to the gang bar, the arrangement being such that the tools can spring upwardly with respect to the gang bar when the tools strike obstructions.

To enable the driver of the tractor to raise and lower the gang bar with the least possible effort, there is shown a lifting lever 18 connected to a rock shaft 19 extending across and suitably journaled on the top of the differential housing of the tractor (Fig. 2), and this lever is operatively connected to the gang bar 15 by means of a series of flexible and rigid links. Herein, the lever 18 is shown as having an ear or lateral extension 20 to which a lifting link 21 is pivotally connected, the ear having a series of holes for attachment of the link so that different leverages may be obtained. The other end of the link is pivotally connected to an upstanding arm 22 which is pivoted at its lower end on the draw links 16. The upper end of the arm 22 has a series of holes in which the link 21 may be connected and a lifting chain 23 is also connected to this arm and to the rear ends of the draw bar members 16, the arrangement being such that the lever and its links have a certain amount of lost motion during the initial lifting movement. Referring to Fig. 2, the other end of the shaft 19 is shown as having a crank arm 24 which is likewise connected to the gang bar in the same manner as that just described. Herein, the ends of the links are shown as being bifurcated and are adapted to be pivotally connected to the arms and the lever by means of suitable pins. The links may be curved at their rear ends to gain additional lifting range of the bar 15.

In order to assist in lifting the gang to its inoperative position, there is shown a tension spring 25 suitably connected to a stationary part of the tractor forwardly of the lifting lever 18 and this spring is operatively connected to the lever so that it is effective after the lever has been initially raised to take up the lost motion and tighten the chain 23. Herein, the rear end of the spring is shown as being connected to a curved link 26 which extends above the shaft 19 and has a bifurcated end 27 adapted to straddle the end of the link 21 and being connected to the lever by the same pin as the lifting link 21. Referring to Fig. 1, it will be seen that the arrangement is such that, when the lever 18 is in its lowermost position, the effective pull of the spring is exerted below the dead center of the pivotal connection of the spring to the lever; hence, the spring does not tend to pull the lever up until after it is moved to a point above the dead center. In other words, the action is somewhat like that of a stiff leg which, when the knee joint is broken, the spring will be brought into action. When the operator lifts the lever to a position where the pivot connecting the link 25 to the lever 18 is above the dead center with respect to the spring, the slack in the chain 23 is taken up and the action of the spring is most effective to lift the gang to its inoperative position; that is to say, the leverage increases until the lever 18 has passed its vertical position. Moreover, the operator does not lift any load until he has started the lever 18 in motion and the parts have acquired some momentum. The spring enables him to lift the gang without a great deal of effort and almost with a snap action. Also, the lever arm of the lifting link decreases when the lever approaches its forward position and, if desired, this arm may be made to swing forwardly past dead center, thus obviating the necessity for any lever locking mechanism.

In order to hold the lever in the dotted position shown in Fig. 1, with the gang in its raised position, there is shown a latch member 28 conveniently secured to the tractor in the path of movement of the lever. Herein, the latch member is secured to one edge of the instrument board of the tractor and is braced by a suitable rod or bar 29 extending from one mud guard, this rod serving as a stop for the forward movement of the lever. The idea is to bring the lever to its forward position and snap it under the catch of latch 28 so that it will be held in that position until the operator is ready to lower the gang. Herein, there is shown a pivoted arm 30 on the latch member 28 to push the lever out of engagement with the latch. The arrangement is such that the operator may grasp the handle of the arm and push it to the left as shown in Fig. 4 and, when he releases it, a spring 31 is so arranged that it moves the arm back to its inoperative position. The spring is adjusted to permit the weight of the gang and tools to move the lever 18 backwards into operative position as soon as the latch is released.

In Figs. 5 and 6, there is shown a modified form of the operating lever and link connections. In this instance, the lever 18' has a perforated plate portion 20' affording a series of openings for the connection of the operating link 21' and the spring link 26', which are preferably connected in different holes. Also, in this instance, the link 21' is shown as having a curved pivoted arm 31 at its lever end to facilitate connection to the perforated plate on the lever. This arrangement is such that the bifurcated end of the link 26' straddles the pivoted end of the arm 31, suitable spacer washers being provided between the bifurcated ends of the arms and the lever plate 20'. A separate bolt 32 is preferably inserted in one of the holes under the arm 31 (Fig. 5) so that, when the lever is shifted forwardly, this bolt will engage the arm 31 thereby increasing the leverage after the gang is initially lifted and enabling it to be lifted faster (see the dotted position in Fig. 5).

If bolt 32 is not used, the levers may be adjusted to secure past center action of links 21—31, causing the gang to remain in raised position without the use of a catch. Lever 18 will have the same range of movement as in the preferred arrangement. In all other respects, the modification is similar to the preferred form, it being understood that either form may be operated by hand or by a foot pedal (not shown).

From the foregoing description, it will be apparent that the improved gang and its operating mechanism and gang can be shifted very easily by the driver of the tractor. The lifting mechanism is so designed as to utilize its lifting effect to maintain the gang in operative position when it is lowered and leaves it free to follow the contour of the ground due to the lost motion connections. Moreover the lowering movement of the gang is automatic when the lever is released. The action of the lifting spring is most effective to assist in raising the gang when the greatest load is on the linkage, and the spring may be sufficiently strong to hold the gang in fully raised position, the effective lever arm of the lifting link being reduced when the lever is moved to its extreme forward position. The arrangement is such that no special pawl and ratchet mechanism is required to maintain the gang in its lowered position. The installation can be very quickly and easily made of a very few parts. Also, the lifting mechanism can quickly be attached to or removed from the tractor housing and is adapted to be attached to any ordinary farm tractor. Further, the special gang draw bar can be attached to the transmission housing of any ordinary tractor without any special securing bars. The weight of the gang is not carried by the rear end of the tractor nor does it require any special rollers to support it.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. In combination with a tractor, a gang draw bar associated therewith; a gang bar pivotally connected to the gang draw bar; a gang lifting lever; a link pivotally connected to the lever; a pivoted arm to which the rear end of the link is connected; a flexible element connected to the pivoted arm and to the gang; a lifting spring operatively connected to the lever; an arm between the spring and the lever so arranged that when the lever is in its lowermost position the spring is inactive to move the lever and when the lever is moved toward lifting position the spring assists in the lifting movement.

2. In combination with a tractor, a cultivator gang pivotally secured to the rear end thereof; lifting means for the gang comprising a lifting lever; a shaft journaled above the tractor housing to which the lever is connected at one end; lifting elements connecting the lever and the shaft to the gang; said lifting elements having lost motion connections to permit the lever to be moved initially without lifting the gang; and a spring operatively connected to the lever and effective to assist in lifting the lever and the gang only after the lost motion has been taken up by the lever.

3. In combination with a tractor, a cultivator gang pivotally connected with respect to the rear end of the tractor, lifting mechanism for the gang comprising a transverse shaft; a lever for rocking the shaft; a plurality of links and flexible elements connecting the lever and shaft with the gang; a tension spring operatively connected to assist the lever in lifting the gang only after it has been moved initially, said connections being arranged in such manner that the effective lever arm of the spring connection increases as the lever is raised and the effective lever arm of the gang lifting link decreases as the lever aproaches the limit of its lifting movement.

4. In combination with a tractor, a cultivator gang pivotally connected with respect to the rear end thereof, lifting mechanism for the gang comprising a transverse shaft mounted on the tractor housing; a lever connected to one end of the shaft; a pair of links, one of which is connected to the lever and the other of which is connected to the shaft; upstanding arms supported by the gang members to which the links are pivotally connected; chains connecting the upstanding arms to the gang; and spring means to assist in lifting the gang after the lever has been moved through a predetermined distance.

5. In combination with a tractor, a gang for cultivators and the like; a lifting device for the gang comprising a lever; a series of links and slack, flexible, pull elements connecting the links to the gang; and a spring operatively connected to the lever and so arranged that it is ineffective when the gang is lowered and is most effective to assist in lifting the gang after the lifting mechanism has been initially moved.

6. In combination with a tractor, a cultivator gang pivotally connected with respect to the rear end thereof; a lifting lever for raising the cultivator to inoperative position; a link pivotally connected to the lever; a pivoted arm extending upwardly from the gang to which said link is pivotally connected; a chain loosely connecting said pivoted arm to the gang whereby the lever can move initially without lifting the gang; a spring connected to the lever and so arranged that when the lever is in its lowered position the spring connection is past its dead center and after the lever has been initially moved the spring connection is swung past its dead center so that the spring will assist in the lifting movement.

7. In combination with a tractor, a cultivator gang adapted to be raised and lowered with respect thereto; lifting mechanism for the gang comprising a pivoted lever, a plurality of links and chains operatively connected to the lever and to the gang; a lifting spring operatively connected to the lever; and a curved arm between the spring and the lever so arranged that when the lever is in its lowermost position the action of the spring is effective to maintain the lever in such position and, after the lever has been initially raised, the action of the spring is effective to assist in the lifting movement throughout the range of movement of the gang.

8. In combination with a tractor, a cultivator gang pivotally mounted at the rear end of the tractor, a pair of upstanding arms pivotally connected with respect to the gang; a transverse shaft journalled on the rear end of the tractor; a lifting lever arranged on the tractor and connected to said transverse shaft; links operatively connecting the lever and the shaft to said upstanding arms; chains connecting the arms to the gang; a spring connected to the lever and effective to assist in raising the gang throughout the range of lifting movement, the connection between the spring and the lever being such that it is effective to maintain the lever in lowered position and to assist in holding the gang in raised position.

9. In combination with a tractor, a cultivator gang pivotally connected to the rear end thereof; lifting means for the gang comprising a pivoted lever arranged on the tractor; links and flexible elements operatively connecting the lever to the cultivator gang; said lever having a perforated portion whereby the leverage may be adjusted; a spring secured at one end to a stationary part of the tractor and operatively connected to the lever; the spring connection including a bent arm pivotally connected to the lever through one of said perforations; and the bent arm being so arranged that when the lever is in gang lowering position the tension of the spring is exerted below the opposed dead center of its lever arm and when the lever is raised the spring is effective to assist in lifting the gang.

In testimony, that I claim the foregoing as my own, I have hereto affixed my signature.

JOHN A. DENNIS.